United States Patent [19]
Barry et al.

[11] Patent Number: 5,588,218
[45] Date of Patent: Dec. 31, 1996

[54] TEACHING PROTRACTOR

[76] Inventors: David Barry; Camilla Barry, both of 49 Lomita Dr., Mill Valley, Calif. 94941

[21] Appl. No.: 449,489

[22] Filed: May 24, 1995

[51] Int. Cl.⁶ ........................................ G01B 5/24
[52] U.S. Cl. ........................ 33/471; 33/1 N; 33/534
[58] Field of Search ..................... 33/471, 1 N, 15 B, 33/15 D, 435, 465, 495, 496, 534, 538, 562; 434/211, 215

[56] References Cited

U.S. PATENT DOCUMENTS

| | | | |
|---|---|---|---|
| 713,096 | 11/1902 | Hess | 33/465 |
| 936,746 | 10/1909 | Szymanski | 33/465 |
| 1,650,553 | 11/1927 | Tresidder | 33/495 |
| 2,641,842 | 6/1953 | Porter, Jr. | 33/471 |
| 2,959,861 | 11/1960 | Stromquist | 33/534 |
| 4,060,900 | 12/1977 | Greenwood | 33/471 |
| 4,535,542 | 8/1985 | Liu et al. | 33/534 |

*Primary Examiner*—Christopher W. Fulton
*Attorney, Agent, or Firm*—Phillips, Moore, Lempio & Finley

[57] ABSTRACT

A protractor is disclosed that reduces the time to teach students how to measure and understand angles, and significantly improves overall student comprehension of angles. The protractor comprises two generally flat members each having a straight edge portion radial to a pivot point to which the members are rotatably attached such that the straight edges define an open sector area having an angle formed by the two edges, one member having angle indicia on a semi-circular portion thereof, and the other member having an indicator portion that intersects the angle indicia to enable the angle defined by the two straight edges to be measured. The protractor offers a significant increase in convenience in measuring and drawing angles.

6 Claims, 2 Drawing Sheets

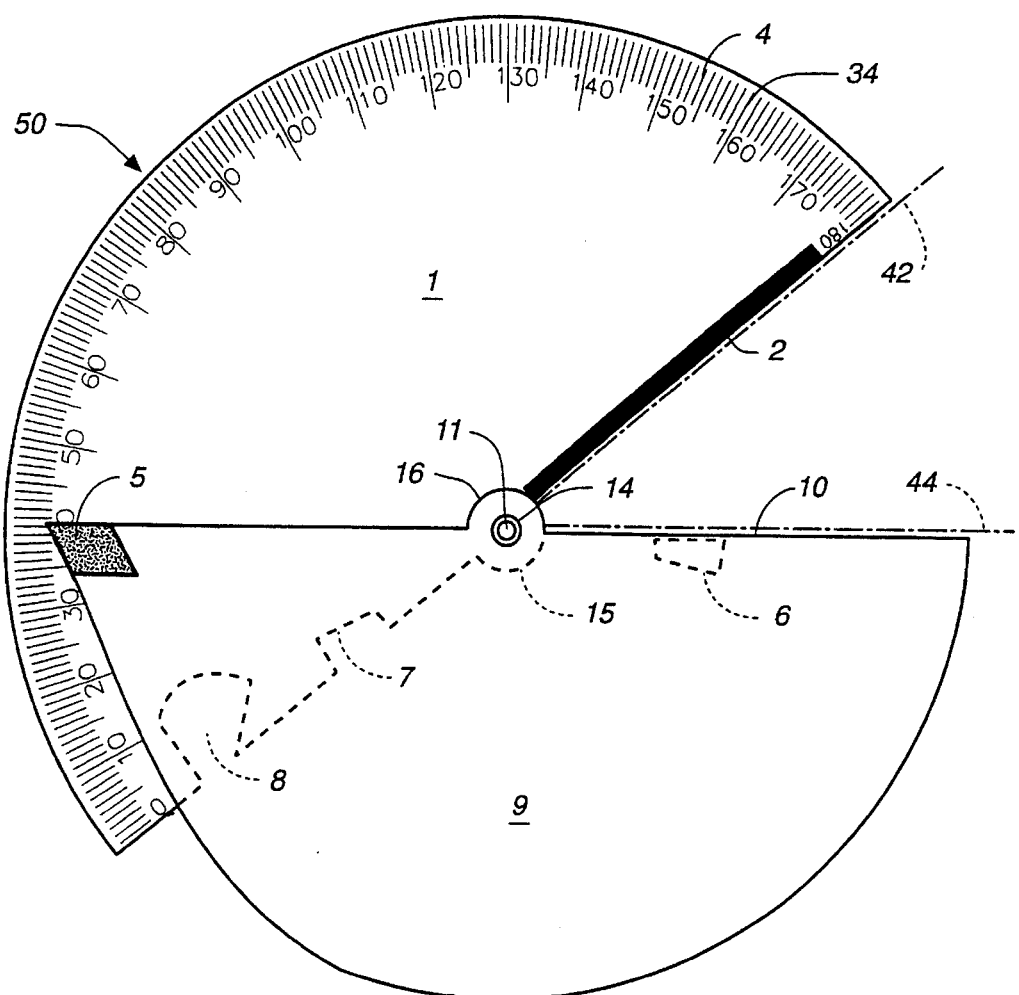
FIG._1
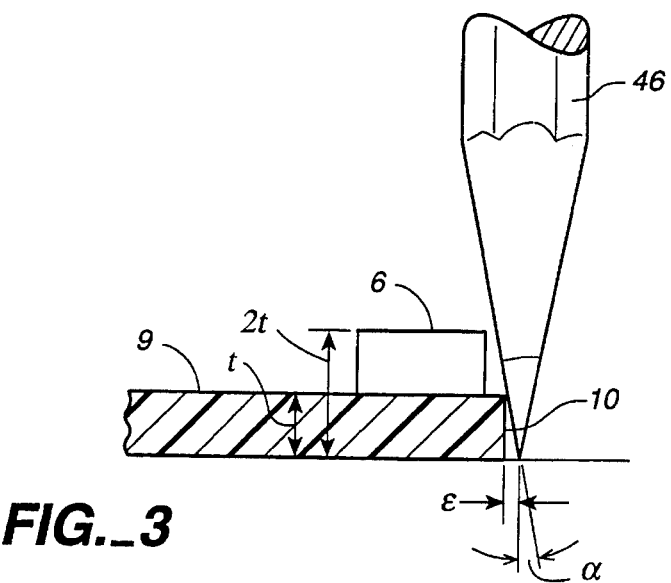
FIG._3

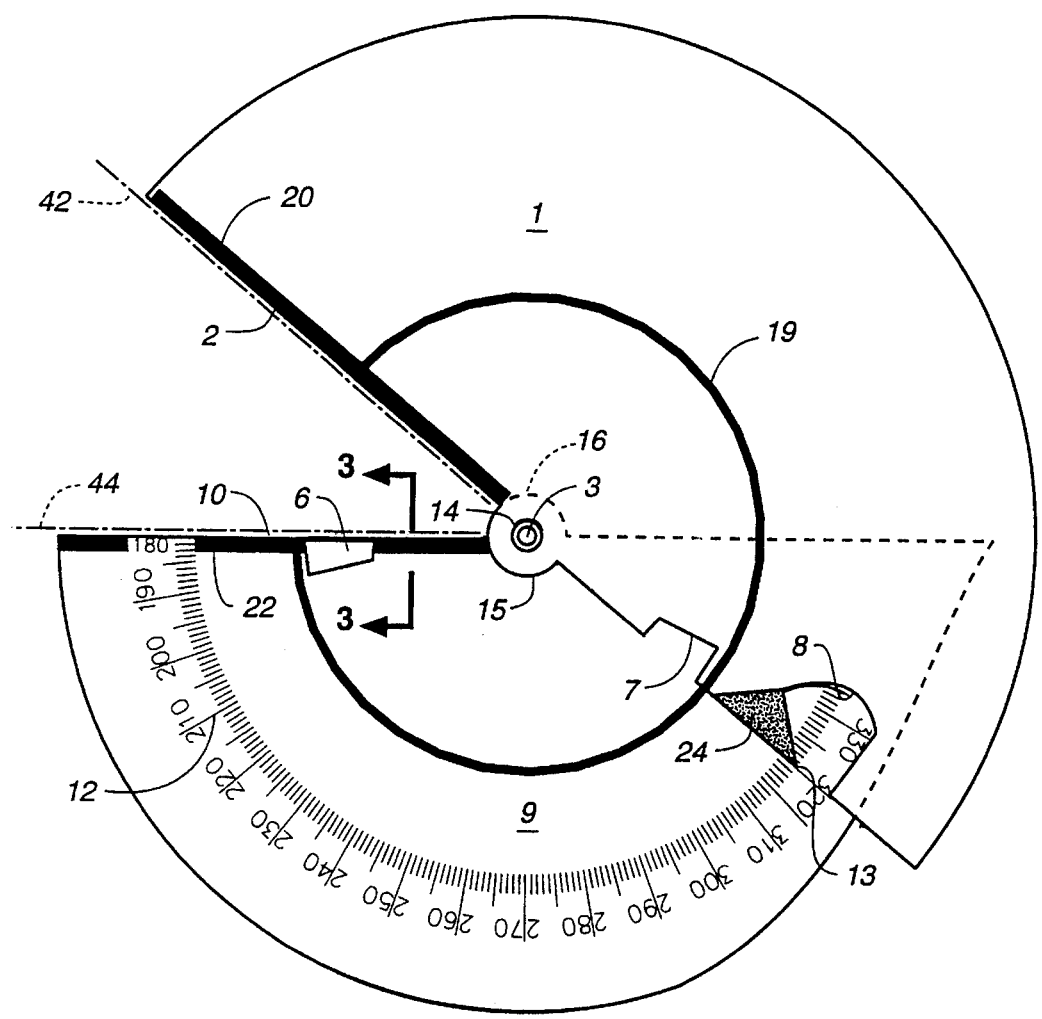
FIG._2
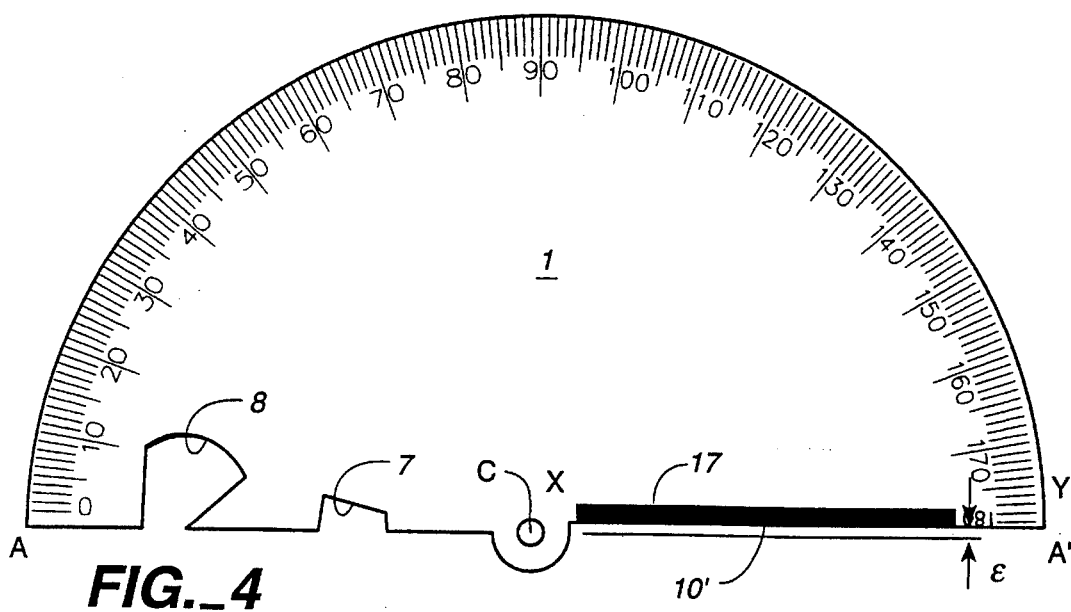
FIG._4

TEACHING PROTRACTOR

TECHNICAL FIELD

This invention relates generally to a protractor and more particularly to an improved protractor for teaching purposes.

BACKGROUND OF THE INVENTION

The protractor is an ancient instrument. In its simplest form, it is a semi-circular disk with angles ranging from zero to 180 degrees around its circumference. Such a device is known to have been used by the 13th century as incorporated into a device, known as a torquetum, which was used in astronomical observations.

Every protractor since the year 1200 has measured angles. Many protractors not only measure angles, but also achieve some other function, such as assisting artisans in laying out angles, providing convenient means for drawing angles, dividing angles, and so on.

The National Assessment of Educational Progress in the United States in 1993 reported that only one third of eighth graders using conventional protractors could successfully measure a 127 degree angle, and that was with an allowance of three degrees on either side of 127 degrees. Any answer between 124 and 130 degrees was counted as correct. Typically, a teacher of fifth or sixth graders might spend an entire class period teaching how to use the protractor, with the result that about half the class can correctly measure an angle. After another class period of teaching, another quarter of the class may have reached proficiency, leaving a quarter of the class without an understanding of how to use the standard protractor. By test time, only a third of the students can measure an angle. Some teachers devote three or four class periods trying to teach students how to measure angles using a conventional protractor.

The use of conventional protractors has been accompanied by ambiguity that reduces student comprehension. Every ambiguity in a protractor requires the student to learn a rule to resolve the ambiguity. Later, at test time, the student has to recall and apply the rule correctly. By eliminating the ambiguity in angle measurement, the student learns faster and achieves greater proficiency.

For example, in the conventional half moon protractor, there are two scales, one reading left to right and the other right to left. For every angle measured, there is a correct and incorrect answer. That is a major ambiguity for students. Another ambiguity is where to line up the legs of the angle. There are several possibilities, which creates more ambiguity. The same can be said for all protractors known prior to the present invention.

To avoid the ambiguities just noted, a pivoted protractor may be used. However, if the pivot is located anywhere other than in line with the two measuring edges, it will scissor, meaning the vertex of the enclosed angle will travel outward as smaller angles are created.

Another problem with conventional protractors is that many angles, both those drawn by students and those in books, have legs too short to reach to the curved portion of the conventional protractor. The angle is unreadable without the awkward and inconvenient step of extending the legs with a ruler and pencil, possibly into the text of the school book. Using a small protractor is no solution, because small degree markings are unreadable.

Finally, the process for constructing angles using a standard half moon is tedious. It involves making several tick marks, removing the protractor from the paper, and then connecting the tick marks.

The object of the present invention is to improve the speed with which students learn to measure and draw angles. The utility of the invention is not only that it successfully measures angles, but also that children can master angle measurement faster and better using the present invention.

SUMMARY OF THE INVENTION

It is an object of the present invention to provide a protractor that enables the user to rapidly and accurately measure angles and eliminate the ambiguities and inaccuracies that accompany the use of conventional protractors.

It is a further object of the present invention to allow for the measurement of angles having leg lengths that are not readily measured by conventional protractors.

It is still another object of the present invention to allow students to directly construct angles from the protractor, rather than from the tedious process with the standard half moon protractor.

The protractor of the present invention comprises two flat members each having a straight edge portion radial to a pivot point at which the two members are rotatably attached, such that the two straight edges define an open sector area having an angle formed by the two edges, one member having angle indicia on a semi-circular portion thereof, and the other member having an indicator portion that points to the angle indicia to enable the angle defined by the two straight edges to be measured.

BRIEF DESCRIPTION OF THE DRAWINGS

FIG. 1 is a top plan view of a protractor in accord with the present invention.

FIG. 2 is a bottom plan view of the protractor depicted in FIG. 1.

FIG. 3 is a partial sectional view of the protractor taken at line 3—3 of FIG. 1.

FIG. 4 is an alternate way to construct the setback of the straight edge of the protractor.

DETAILED DESCRIPTION OF A PREFERRED EMBODIMENT

In a preferred embodiment of the present invention as depicted in FIGS. 1 and 2, the two members are of different general size, one having a greater surface area than the other. However, the present invention is not limited to embodiments where one member is larger than the other.

FIG. 1 shows a preferred embodiment of the top side of the protractor 50. The protractor comprises larger member 1 and smaller member 9 both generally flat and semicircular in shape. Larger member 1 has a semicircular portion 4, straight edge 2, and window 8 (see also FIG. 2). Larger member 1 also has a hole 3 and hub 15 which are shown in FIG. 2. Semicircular portion 4 has angle indicia 34 in the form of an arcuate scale therein. Smaller member 9 is slightly smaller in surface area than larger member 1, and has straight edge 10, indicator 5 (see FIG. 1), angle indicia 12 in the form of an arcuate scale, hole 11 and hub 16.

Larger member 1 and smaller member 9 are attached by lining up holes 3 and 11 and placing a grommet 14 in the holes to pivotally attach the two members. Other schemes to pivotally attach the members 1 and 9 are within the scope of the invention.

The holes 3 and 11 of the two members are located such that the center of each hole is at the center of the arcuate scales 34 and 12 of each member. The holes 3 and 11 are also located such that their centers are proximate the straight line extension of the two straight edges 2 and 10. Straight edges 2 and 10 are set back from the true straight line extensions 42 and 44 an amount equal to approximately one half a pencil width. Measurement takes place by laying straight edges 2 and 10 just adjacent to and parallel with the legs of the angle. Further, displacement is equal to approximately one-half a pencil's width. This is shown in FIG. 3, where member 9 is shown in cross section with a sharpened pencil 46 shown in position to draw a line using straight edge 10 as a guide. The offset ε is derived from the thickness t of the member 9 and the angle α of the point of a pencil. The result is:

$$\epsilon = t \tan \alpha$$

Normally, pencils have an α of about 8.5° and the thickness t of a protractor is about 0.5 mm. Using the formula above, the offset would be 0.08 mm. However, one must assume a width of the pencil end of between 0.5 and 1 mm and adjust accordingly. Test results have shown offsets of between 0.1 and 0.75 mm are suitable, with 0.5 mm the preferred amount.

The smaller member 9 includes an indicator 5 placed at a point on smaller member 9 such that it sweeps along the arcuate scale 4 of the larger member 1 as the two members are pivotally rotated. It is preferred, but not necessary, that the tip of indicator 5 be located at the extreme of the straight line extension of the straight edge 10 of the smaller member 9, on the side opposite the pivot hole from the straight line portion.

The arcuate scale 34 on member 1 is placed concentric with the center of hole 3. It is placed such that when the straight edge 2 of the larger member is placed adjacent one leg of an angle, and the straight edge 10 of member 9 is placed adjacent the other leg of the angle, with the vertex of the angle at the center of the grommet 14, indicator 5 correctly indicates on scale 34 the size of the angle being measured. When moved to a different position, indicator 5 will point to the angle subtended by the two straight edges 2 and 10. When the arcuate scale 34 is placed as shown in FIG. 1, the device will measure all angles between 1 and 180 degrees.

To measure reflex angles (those between 180 and 360 degrees), the device is turned over as shown in FIG. 2. FIG. 2 shows a preferred embodiment of the reverse side of the device with heavy black lines 20 and 22 highlighting straight edges 2 and 10, respectively. A black circular arc 19 has been added to indicate visually that reflex angles are being indicated. In any position, the sum of the angles indicated on the front and reverse sides of the protractor will always add up to 360 degrees.

An indicator 13 is built as part of the cut-out window 8 in the larger member by darkening or otherwise highlighting a pointed section 24 of the cut-out window 8 such that it sweeps along the arcuate scale 12 of the smaller member 9 as the two members are pivotally rotated. It is preferred, but not necessary, that the tip of indicator 13 be located along the straight line extension of the straight edge 2 of the larger member 1, on the side opposed from the center of the straight line portion.

The arcuate scale 12 on member 9 is placed concentric with the center of hole 11. It is placed such that when the straight edge 2 of the larger member 1 is placed adjacent one leg of an angle, and the straight edge 10 of member 9 is placed adjacent the other leg of the angle, with the vertex of the angle at the center of the grommet 14, indicator 13 points to the degree that is the same as the reflex angle being measured. When moved to a different position, indicator 13 will point to the reflex angle subtended by the two straight edges 2 and 10. When the arcuate scale 12 is placed as shown in FIG. 2, the device will measure all angles between 181 and 360 degrees.

Because of the universal practice of placing the straight edges under, rather than on, the legs of the angle to be measured, a preferred embodiment of the device makes a slight modification from the construction described above. This modification increases the likelihood that one using the device will achieve correct results. It is necessary because the theory of the invention is that the legs of the angle to be measured are radial to the center of the grommet. If the straight edges 2 and 10 are built as described above, and the user places the legs next to rather than on the legs of the angle, then the legs of the angle will not be radial to the center of the grommet, but radial to a point slightly away from the center, yielding slightly incorrect results. The structure of this protractor as described above lets one place the straight edges 2 and 10 adjacent the legs of the angle and still obtain the true measure.

A removable strip 17 can be used to establish the setback edge 10' (see FIG. 4). FIG. 4 presents the geometry of the strip of material 17 to be removed from the straight edge 10' to increase the accuracy of the device under expected use. Line A-C-D-A' is the straight line passing through C, the center of the hub 16 of member 9. Strip 17 is the four-sided figure D-A'-Y-X. Line segment A'Y is a curve, but it may be regarded as a straight line segment. Angle XDA' is ninety degrees. Line segment 17 is, in practice, approximately 0.5 millimeters wide.

Strip 17 is removed from straight edge 10, resulting in a new straight edge 10' being parallel to the original straight edge 10, but now set back or moved inboard. In the preferred embodiment, the width of the removed strip is 0.5 millimeters. Similarly, a strip may be removed from straight edge 2 to accomplish the same result.

The user may use the described protractor for drawing angles to a given point. When the protractor is placed so that the center of the grommet is placed over a given point, and the two straight edges are set to the desired angle, the user may run a pencil along the two edges to achieve the angle. The width of the hubs 15 and 16, which overlap, will leave a gap between the given point and the ends of the two legs of the angle, which are readily connected by extending the two lines to the vertex of the angle. The structure of the straight edges 2 and 10 described above will insure a true angle.

To prevent the two members from turning the wrong way, a stop may be constructed to restrict the relative movements of the two members. As shown in FIG. 2 in a preferred embodiment, the stop 6 is added to member 9 on the side facing member 1 such that one edge of the stop 6 is set back slightly from straight edge 10 to prevent interference with a pencil as shown in FIG. 3. Stop 6 has a thickness or height no greater than t, the thickness of member 9, so that the device can be turned over. A recess 7 the same shape as the stop is cut in the edge of member 1 opposite edge 2 such that when the stop is fully embedded in the recess, indicator 5 shows 180 degrees on arcuate scale 34. When so constructed, member 9 can be rotated all the way to the point that indicator 5 points to zero degrees and can then turn no further because the stop is now resting against straight edge 2.

The present invention enables virtually all students to understand how to use a protractor within twenty minutes of teaching. Indeed, students as young as the second grade immediately grasp the method of measurement, and students' test results are uniformly close to 100 percent at all grade levels tested.

Although the most common application of the invention is expected to be in the field of education, anyone who measures or draws angles will find this invention a significant improvement over conventional protractors.

While the invention has been described with respect to a specific embodiment thereof, it is to be understood that other modifications and changes may be made to the disclosed embodiments without departing from the spirit and scope of the invention as defined by the appended claims.

What is claimed is:

1. A protractor device for measuring and drawing angles, comprising:

first and second generally flat members each defining a pivot point, each member having a straight edge portion extending generally radially from said pivot points, said straight edge portions offset from a line extending radially from said pivot point by an amount greater than 0.1 mm and less than 1.5 mm, a means for rotatably attaching the two generally flat members such that the straight edge portions define an angle, said first member further defining a semi-circular portion having a center coincident with the pivot point, angle indicia located on said semi-circular edge portion, and an indicator portion on the second member which intersects the angle indicia of the first member enabling the angle defined by the two straight edge portions to be measured.

2. The protractor of claim 1 wherein the offset is 0.5 min.

3. The protractor of claim 1 wherein said pivot point defines a hole.

4. The protractor of claim 1 wherein the second member includes a stop thereon adjacent the straight edge portion thereof which projects into the plane of the first member, said first member defining a recess adjacent the indicator, said stop fitting into said recess of the first member, such that the pair of members do not pivot beyond a point corresponding to the smallest degree measurement as shown on the angle indicia.

5. The protractor of claim 1 wherein the second member contains arcuate angle indicia on the back side concentric with the pivot point, and said first member includes an indicator portion on the back side which intersects the indicia on the second member to enable measurement of the reflex angle subtended by the two straight edges.

6. A protractor device for measuring and drawing angles, comprising:

two generally flat, two-sided members rotatably attached to each other at a pivot point, each member having a straight edge portion, said straight edge portions offset from a line extending radially from said pivot point by an amount greater than 0.1 mm and less than 1.5 mm such that the two straight edge portions define an angle, each member having:

an angle indicia on one side of one member, said indicia concentric with the pivot point, and an indicator portion on the reverse side of the other member which intersects the angle indicia on the one member enabling the angles defined by the two straight edges to be measured, and a means for pivotally attaching the first member to the second member.

* * * * *